United States Patent
Chen (10) Patent No.: US 11,490,336 B2
(45) Date of Patent: *Nov. 1, 2022

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/163,055

(22) Filed: Jan. 29, 2021

(65) Prior Publication Data
US 2021/0153136 A1 May 20, 2021

Related U.S. Application Data

(63) Continuation of application No. 16/621,230, filed as application No. PCT/CN2017/096072 on Aug. 4, 2017, now Pat. No. 10,945,215.

(51) Int. Cl.
*H04W 52/14* (2009.01)
*H04W 72/12* (2009.01)

(52) U.S. Cl.
CPC ..... *H04W 52/146* (2013.01); *H04W 72/1268* (2013.01); *H04W 72/1289* (2013.01)

(58) Field of Classification Search
CPC .. H04L 5/0048; H04W 52/146; H04W 52/16; H04W 72/1268; H04W 72/1289
(Continued)

(56) References Cited

U.S. PATENT DOCUMENTS

| 10,945,215 B2* | 3/2021 | Chen | H04W 72/1268 |
| 2012/0314600 A1* | 12/2012 | Zeira | H04W 72/0406 |
| | | | 370/252 |

(Continued)

FOREIGN PATENT DOCUMENTS

| CN | 101174858 A | 5/2008 |
| CN | 102835033 A | 12/2012 |

(Continued)

OTHER PUBLICATIONS

3GPP TSG-RAN WG1 #89; R1-1708714 Hangzhou, China, May 15-19, 2017.

(Continued)

*Primary Examiner* — Tan H Trinh (74) *Attorney, Agent, or Firm* — Young Basile Hanlon & MacFarlane, P.C.

(57) ABSTRACT

The implementations of the present disclosure provide a wireless communication method and device, being able to determine, with reference to the transmission power of one uplink signal, the transmission power of another signal as required in a reasonable manner, and directly schedule the fixed transmission power without the need of a network device, thereby improving the communication performance. The method comprises: a terminal device determining a reference uplink signal of a target uplink signal; the terminal device determining the transmission power of the target uplink signal according to the transmission power of the reference uplink signal; and the terminal device transmitting the target uplink signal by using the determined transmission power.

15 Claims, 3 Drawing Sheets

(58) Field of Classification Search
USPC .......................... 455/69, 522; 370/252, 329
See application file for complete search history.

(56) References Cited

U.S. PATENT DOCUMENTS

| | | | |
|---|---|---|---|
| 2014/0016576 A1* | 1/2014 | Noh ...................... | H04L 5/0048 370/329 |
| 2016/0192356 A1 | 6/2016 | Lee et al. | |
| 2017/0055229 A1* | 2/2017 | Klockar .............. | H04W 52/244 |
| 2017/0070964 A1 | 3/2017 | Iwai et al. | |
| 2017/0223640 A1 | 8/2017 | Dinan | |
| 2018/0145854 A1* | 5/2018 | Akkarakaran ....... | H04B 7/0669 |
| 2020/0204335 A1* | 6/2020 | Kim .................... | H04L 25/0214 |
| 2021/0281374 A1* | 9/2021 | Kim ........................ | H04J 13/18 |

FOREIGN PATENT DOCUMENTS

| | | |
|---|---|---|
| CN | 103379605 A | 10/2013 |
| EP | 2693813 A1 | 2/2014 |
| RU | 2472318 C2 | 1/2013 |

OTHER PUBLICATIONS

Extended EP Search Report for EP Application No. 17919797.5 dated Mar. 19, 2020.
3GPP TSG RAN WG1 NR Ad Hoc Meeting; R1-1710459; Discussion on UL SRS transmission power; Qingdao, China, Jun. 27-30, 2017; pp. 1-4.
3GPP TSG RAN WG1 NR Ad-Hoc#2; R1-1710356; Discussion on uplink power control for NR; Qingdao, P.R. China Jun. 27-30, 2017; pp. 1-6.
3GPP TS 36.213 V14.3.0 (Jun. 2017); pp. 1-42.
3GPP TSG-RAN WG1 #89; R1-1707384; DCI design considerations for NR; Hangzhou, P.R. China, May 15-19, 2017; pp. 1-5.
3GPP TSG RAN WG1 NR Ad-Hoc#2; R1-1710174; Qingdao, P.R. China, Jun. 27-30, 2017.
3GPP TS 36.213 V11.0.0 (Sep. 2012); 3rd Generation Partnership Project; Technical Specification Group Radio Access Network; Evolved Universal Terrestrial Radio Access (E-UTRA); Physical Layer Procedures (Release 11).
Communnication pursuant to Article 94(3) Examination for EP Application 17919979.5 dated Oct. 22, 2020.
Russia First Office Action with English Translation for RU Application 2019139248/07(077204) dated Sep. 11, 2020.
3GPP TSG RAN WG1 Meeting #89; Hangzhou, P.R. China May 15-19, 2017; R1-1707617.
3GPP TSG RAN WG1 Meeting NR Ad-Hoc #2; Qingdao, China, 27'h-301h Jun. 2017; R1-1710359.
3GPP TSG RAN WG1 NR Ad-Hoc#2; Qingdao, P.R. China, Jun. 27-30, 2017; R1-1711631.
Russia Notice of Allowance with English Translation for RU Application 2019139248/07(0/7204).
Canada First Office Action for CA Application 3063783 dated Dec. 15, 2020.
International Search Report with English Translation for PCT/CN/2017/096072 dated Apr. 28, 2018.
Communnication pursuant to Article 94(3) Examination for EP Application 17919797.5 dated Mar. 12, 2021.
India First Examination Report for IN Application 201917054310 dated May 10, 2021.
Canadian Examination Report for CA Application 3063783 dated Sep. 22, 2021 . (3 pages).
Communication pursuant to Article 94(3) EPC for EP Application 17919797.5 dated Jul. 20, 2021. (4 pages).
Singapore Invitation to Respond to Written Opinion for SG Application 11201910738P dated Aug. 9, 2021. (7 pages).
Communication pursuant to Article 94(3) EPC for EP Application 17919797.5 dated Dec. 10, 2021. (4 pages).

* cited by examiner

WIRELESS COMMUNICATION METHOD AND TERMINAL DEVICE

CROSS-REFERENCE TO RELATED APPLICATION(S)

This application a continuation of U.S. patent application Ser. No. 16/621,230 filed on Dec. 10, 2019, which is a 371 of International Application No. PCT/CN2017/096072, filed on Aug. 4, 2017. The entire contents of the above-identified applications are incorporated herein by reference.

TECHNICAL FIELD

The present disclosure relates to a field of communications, and more particularly, to a wireless communication method and terminal device.

BACKGROUND

In a Long Term Evolution (LTE) system, a base station may instruct a terminal device to determine an uplink transmission power to be adopted by configuring a power control parameter.

In a future communication system, a requirement for communication performance is high, therefore, how to make an improvement on a transmission power of terminal device to improve communication performance is an urgent problem to be solved.

SUMMARY

Implementations of the present disclosure provide a wireless communication method and a terminal device.

In a first aspect, a wireless communication method is provided, including:

determining, by a terminal device, a reference uplink signal of a target uplink signal;

determining, by the terminal device, a transmission power of the target uplink signal according to a transmission power of the reference uplink signal;

transmitting, by the terminal device, the target uplink signal by using the determined transmission power.

In combination with the first aspect, in a possible implementation mode of the first aspect, the target uplink signal may be a Physical Uplink Shared Channel (PUSCH), a Physical Uplink Control Channel (PUCCH), a Physical Random Access Channel (PRACH), a Phase Tracking Reference Signal (PTRS), or a Sounding Reference Signal (SRS).

In combination with the first aspect or any of the above possible implementation modes, in another possible implementation mode of the first aspect, the reference uplink signal is a PUSCH, a PUCCH, a PRACH, a PTRS, or an SRS.

In combination with the first aspect or any of the above possible implementation modes, in another possible implementation mode of the first aspect, the target uplink signal and the reference uplink signal are uplink signals of a same type.

In combination with the first aspect or any of the above possible implementation modes, in another possible implementation mode of the first aspect, the target uplink signal is an SRS transmitted on a first SRS resource, and the reference uplink signal is an SRS transmitted on a second SRS resource associated with the first SRS resource.

In combination with the first aspect or any of the above possible implementation modes, in another possible implementation mode of the first aspect, the first SRS resource and the second SRS resource belong to a same SRS resource group.

In combination with the first aspect or any of the above possible implementation modes, in another possible implementation mode of the first aspect, the second SRS resource is an SRS resource configured by a network device for the first SRS resource in the SRS resource group; or, the second SRS resource is a preset SRS resource in the SRS resource group.

In combination with the first aspect or any of the above possible implementation modes, in another possible implementation mode of the first aspect, the same SRS resource group is used for an uplink beam management.

In combination with the first aspect or any of the above possible implementation modes, in another possible implementation mode of the first aspect, the second SRS resource is an SRS resource configured for the terminal device by the network device through an SRS Resource Indication (SRI) and associated with the first SRS resource.

In combination with the first aspect or any of the above possible implementation modes, in another possible implementation mode of the first aspect, the target uplink signal is a PUSCH; and determining, by the terminal device, the reference uplink signal of the target uplink signal, includes: determining, by the terminal device, the reference uplink signal based on Downlink Control Information (DCI) for scheduling the PUSCH.

In combination with the first aspect or any of the above possible implementation modes, in another possible implementation mode of the first aspect, the target uplink signal is a PTRS, and the reference uplink signal is a PUSCH or a DMRS transmitted on the Demodulation Reference Signal (DMRS) port associated with the PTRS.

In combination with the first aspect or any of the above possible implementation modes, in another possible implementation mode of the first aspect, the target uplink signal and the reference uplink signal satisfy a specific relationship on at least one of a frequency domain transmission resource, a time domain transmission resource, a transmission port and a transmission beam.

In combination with the first aspect or any of the above possible implementation modes, in another possible implementation mode of the first aspect, the target uplink signal and the reference uplink signal are transmitted on a same carrier or adjacent carriers.

In combination with the first aspect or any of the above possible implementation modes, in another possible implementation mode of the first aspect, the target uplink signal and the reference uplink signal are transmitted through a same port.

In combination with the first aspect or any of the above possible implementation modes, in another possible implementation mode of the first aspect, the target uplink signal and the reference uplink signal are transmitted through a same beam.

In combination with the first aspect or any of the above possible implementation modes, in another possible implementation mode of the first aspect, the target uplink signal is an SRS, and the reference uplink signal is a PUSCH or a PUCCH transmitted last time before transmitting the SRS.

In combination with the first aspect or any of the above possible implementation modes, in another possible implementation mode of the first aspect, the target uplink signal is an uplink signal of a New Radio (NR) system, and the reference uplink signal is an uplink signal of a Long Term Evolution (LTE) system.

In combination with the first aspect or any of the above possible implementation modes, in another possible implementation mode of the first aspect, the terminal device determines the transmission power of the reference signal uplink signal as the transmission power of the target uplink signal.

In combination with the first aspect or any of the above possible implementation modes, in another possible implementation mode of the first aspect, the terminal device obtains the transmission power of the target uplink signal based on the transmission power of the reference uplink signal and an offset.

In a second aspect, a terminal device is provided to be used for performing the method of above first aspect or the method in any possible implementation mode of the first aspect. Specifically, the terminal device includes function modules used for executing the method in the first aspect or any possible implementation mode of the first aspect.

In a third aspect, a terminal device is provided, including: a processor, a memory, and a transceiver. The processor, the memory, and the transceiver communicate with each other through internal connection paths to transfer control and/or data signals, so that the terminal device implements the method in the first aspect or any possible implementation mode of the first aspect.

In a fourth aspect, a computer readable medium for storing a computer program is provided. The computer program includes instructions for executing any one of the above methods or any one of the above possible implementation modes.

BRIEF DESCRIPTION OF DRAWINGS

In order to describe technical solutions of implementations of the present disclosure more clearly, accompanying drawings that need to be used in descriptions of the implementations or the prior art will be briefly introduced below. It is apparent that the accompanying drawings described below are only some implementations of the present disclosure, and for a person of ordinary skill in the art, other drawings may be obtained according to these drawings without paying an inventive effort.

DETAILED DESCRIPTION

Technical solutions in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, or a future 5G system (or named as a New Radio (NR) system).

Figure 1:
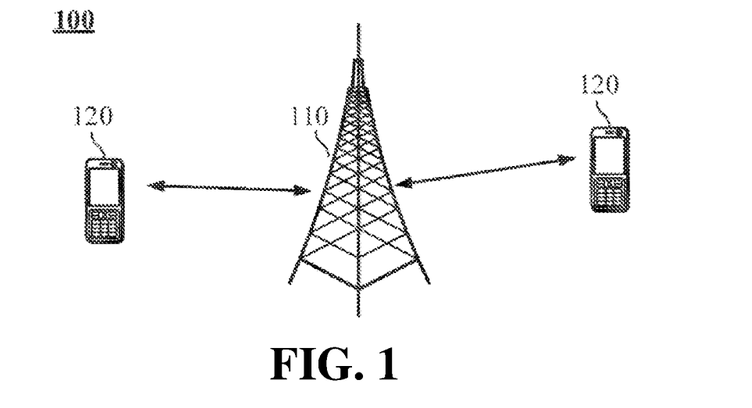
FIG. 1 is a schematic diagram of a wireless communication system according to an implementation of the present disclosure.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a specific geographical area, and may communicate with a terminal device (e.g., a UE) in the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN).

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a future 5G network, or a terminal device in a future evolved Public Land Mobile Network (PLMN), or the like.

Optionally, a terminal direct connection (Device to Device, D2D) communication may be performed between the terminal devices 120.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within a coverage area of each network device, which is not restricted in implementations of the present disclosure.

Optionally, the wireless communication system 100 may further include other network entities such as a network controller, a mobile management entity, which is not restricted in implementations of the present disclosure.

It should be understood that terms "system" and "network" are often used interchangeably in this document. Term "and/or" in this document is merely an association relationship describing associated objects, indicating that there may be three relationships, for example, A and/or B may indicate three cases: A alone, A and B, and B alone. In addition, symbol "/" in this document generally indicates that objects before and after the symbol "/" have an "or" relationship.

Figure 2:
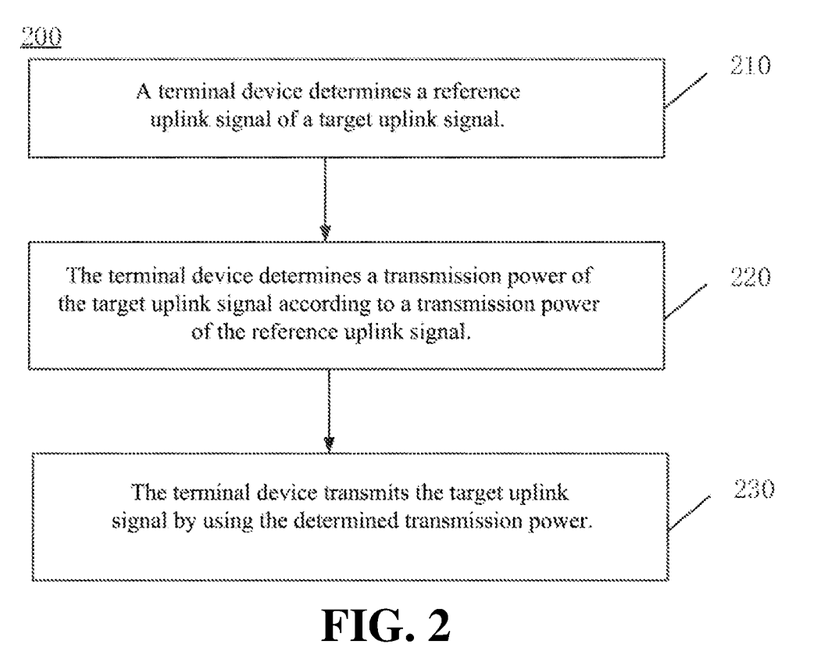
FIG. 2 is a schematic flowchart of a wireless communication method according to an implementation of the present disclosure.

FIG. 2 is a schematic flowchart of a wireless communication method 200 according to an implementation of the present disclosure. The method 200 may optionally be applied to the system shown in FIG. 1, but is not limited thereto. The method 200 includes at least some of following contents of acts 210 to 230.

In act 210, a terminal device determines a reference uplink signal of a target uplink signal. Wherein determining the reference uplink signal of the target uplink signal is used for determining a transmission power of the target uplink signal based on a transmission power of the reference uplink signal.

Optionally, the target uplink signal may be a Physical Uplink Shared Channel (PUSCH), a Physical Uplink Control Channel (PUCCH), a Physical Random Access Channel (PRACH), a Phase Tracking Reference Signal (PTRS), or a Sounding Reference Signal (SRS).

Optionally, the reference uplink signal may be a PUSCH, a PUCCH, a PRACH, a PTRS, or an SRS.

It should be understood that the signal is a channel (for example, the target uplink signal is a PUSCH) mentioned in the present disclosure means that the signal is transmitted through the channel.

Optionally, the target uplink signal and the reference uplink signal may be signals in different systems (networks). For example, the target uplink signal is an uplink signal of an NR system and the reference uplink signal is an uplink signal of an LTE system.

Of course, the target uplink signal and the reference uplink signal may also be signals in the same system (network).

Optionally, the target uplink signal and the reference uplink signal may be uplink signals of different types. In the present disclosure, a type of an uplink signal may be distinguished by a transmission mode of the uplink signal or a purpose of the uplink signal.

The target uplink signal may be any one of a PUSCH, a PUCCH, a PRACH, a PTRS, and an SRS, and the reference uplink signal may be any one of a PUSCH, a PUCCH, a PRACH, a PTRS, and an SRS, which is of different type from the target uplink signal.

For example, the target uplink signal is a PUCCH, and the reference uplink signal may be an SRS; or, the target uplink signal is an SRS, and the reference uplink signal may be a PUCCH.

Optionally, the target uplink signal and the reference uplink signal may be uplink signals of the same type.

For example, the target uplink signal is an SRS and the reference uplink signal is another SRS. Or, the target uplink signal is a PUCCH and the reference uplink signal is another PUCCH.

Optionally, the target uplink signal is an SRS transmitted on a first SRS resource, and the reference uplink signal is an SRS transmitted on a second SRS resource associated with the first SRS resource.

It should be understood that an association relationship between the first SRS and the second SRS mentioned here may be in various ways. An introduction will be given below in combination with several ways.

Optionally, the first SRS resource and the second SRS resource belong to the same SRS resource group.

Optionally, the SRS resource group may include multiple SRS resources.

Optionally, parameter configuration of each SRS resource in the multiple SRS resources is independent of those of other SRS resources, which may specifically include at least one of following parameter configurations: a time domain resource occupied for transmitting an SRS; a frequency domain resource occupied for transmitting an SRS; an SRS sequence used for transmitting an SRS; the number of times of transmitting an SRS after receiving a trigger signaling sent by a network device. A network side may allocate a configuration parameter for each SRS resource with an independent signaling.

Optionally, the second SRS resource is an SRS resource, configured by a network device for the first SRS resource, in the SRS resource group.

Specifically, the network device may configure a reference SRS resource for all SRS resources in the SRS resource group (the reference SRS resource also belongs to the SRS resource group, for example, an SRS resource with a lowest index in the SRS resource group). The terminal device may determine transmission powers for transmitting SRSs on other SRS resources based on a transmission power of an SRS transmitted on the reference SRS resource, so that transmission powers for transmitting SRSs on all SRS resources in the SRS resource group may be the same.

Alternatively, the network device may configure different reference SRS resources for different SRS resources in the SRS resource group. For example, a reference resource configured for an SRS resource 1 and an SRS resource 2 may be an SRS resource 3, and a reference resources configured for an SRS resource 4 and an SRS resource 5 may be an SRS resource 6, so that transmission powers for transmitting SRSs on the SRS resource 1, the SRS resource 2 and the SRS resource 3 may be the same, and transmission powers for transmitting SRSs on the SRS resource 4, the SRS resource 5 and the SRS resource 6 may be the same.

Alternatively, the second SRS resource may be a preset SRS resource in the SRS resource group. The preset SRS resource mentioned here is not configured by a network device, for example, the preset SRS resource is an SRS resource specified in a protocol.

Specifically, a reference SRS resource may be preset for all SRS resources in the SRS resource group, and the terminal device may determine transmission powers for transmitting SRSs on other SRS resources based on a transmission power of an SRS transmitted on the reference SRS resource, so that transmission powers of SRSs transmitted on all SRS resources in the SRS resource group may be the same.

Alternatively, reference SRS resources preset for different SRS resources in the SRS resource group may be different. For example, a reference resource preset for an SRS resource 1 and an SRS resource 2 may be an SRS resource 3, and a reference resource preset for an SRS resource 4 and an SRS resource 5 may be an SRS resource 6, so that transmission powers for transmitting SRSs on the SRS resource 1, the SRS resource 2 and the SRS resource 3 may be the same, and transmission powers for transmitting SRSs on the SRS resource 4, the SRS resource 5 and the SRS resource 6 may be the same.

Optionally, the target uplink signal may be SRSs transmitted on multiple SRS resources, for example, may be SRSs transmitted on all SRS resources in a SRS resource group. If SRSs transmitted on a SRS resource group corresponds to a reference uplink signal, then the same transmission power may be determined when all SRS resources in the group are used for transmitting the SRSs, which may be used for an uplink beam management.

Optionally, the SRS resource group may be an SRS resource group configured in advance by a network side for an uplink beam management.

Optionally, the uplink beam management includes a transmitting beam management and/or a receiving beam management.

For a transmitting beam management, a terminal device may use different transmission beams to transmit SRSs on different SRS resources in multiple SRS resources. A network device may select at least one SRS resource to indicate to the terminal device based on received signal strengths on the multiple SRS resources, thus enabling the terminal device to transmit data using a beam corresponding to the SRS resource.

For a receiving beam management, a terminal device may use the same beam to transmit SRSs on multiple SRS resources. A network device may receive SRS signals on multiple SRS resources based on different receiving beams, and select a receiving beam for receiving data according to received signal strengths.

Optionally, in an implementation of the present disclosure, when performing the beam management, a terminal device may use the same transmission power to transmit SRSs. In this case, a network device may configure the same reference SRS resource for SRS resources in a SRS resource group, so as to transmit SRSs, on the SRS resources in the SRS resource group, all by a transmission power for transmitting SRSs on the reference SRS resource, thus an uplink beam management is achieved.

Optionally, the second SRS resource associated with the first SRS resource is an SRS resource configured by a network device for a terminal device through an SRS Resource Indication (SRI) and associated with the first SRS resource.

For example, when configuring an SRS resource for transmitting a target uplink signal, the network device configures an associated SRS resource for the SRS resource through an upper-layer signaling.

For example, before receiving the SRI, the terminal device may transmit SRS signals on an SRS resource group including an SRS resource indicated by the SRI, and different SRS resources may optionally adopt different transmission powers for transmitting. After receiving the SRS on the SRS resource group, the network device may select an SRS resource 1 and may indicate the selected SRS resource 1 to the terminal device through the SRI. Specifically, the network device may indicate the selected SRS resource 1 to the terminal device through DCI for scheduling uplink data transmission or scheduling uplink control information transmission. Therefore, when transmitting the target uplink signal, the terminal device may adopt the same transmission power (which may be a transmission power used for transmitting an SRS on the present SRS resource 1 or a transmission power used for transmitting an SRS on a previous SRS resource 1) as used for transmitting an SRS on the SRS resource 1.

Optionally, the target uplink signal is a PUSCH. The terminal device may determine a reference uplink signal based on Downlink Control Information (DCI) for scheduling the PUSCH.

For example, the network device may indicate an SRS resource by DCI for scheduling the PUSCH and use an SRS transmitted on the SRS resource as the reference uplink signal. Specifically, the SRS may be indicated by the SRS resource indicated with the above-mentioned SRI carried in the DCI mentioned above, so that the terminal device may determine a transmission power of the PUSCH based on a transmission power for transmitting the SRS on the SRS resource.

Optionally, the SRS transmitted on the SRS resource indicated by the above-mentioned SRI may be used as a reference uplink signal for target uplink signals other than PUSCH or SRS, which is not specifically restricted in implementations of the present disclosure.

Optionally, the target uplink signal is a PTRS, and the reference uplink signal is a PUSCH or a DMRS transmitted on a Demodulation Reference Signal (DMRS) port associated with the PTRS.

Optionally, the target uplink signal and the reference uplink signal satisfy a specific relationship on at least one of a frequency domain transmission resource, a time domain transmission resource, a transmission port, and a transmission beam.

In an implementation mode, the target uplink signal and the reference uplink signal are transmitted on the same carrier or adjacent carriers.

Optionally, in the implementation mode, the target uplink signal and the reference uplink signal may not be signals under the same system (network), for example, the target uplink signal is an uplink signal of a New Radio (NR) system, and the reference uplink signal is an uplink signal of a Long Term Evolution (LTE) system. For example, if the uplink signal of the NR system and the uplink signal of the LTE system work on the same carrier, a similar transmission power may be used for transmission.

In an implementation mode, the target uplink signal and the reference uplink signal are transmitted through the same port.

In an implementation mode, the target uplink signal and the reference uplink signal are transmitted through the same beam.

In an implementation mode, the target uplink signal is an SRS, and the reference uplink signal is a PUSCH or a PUCCH transmitted last time before transmitting the SRS.

In act 220, the terminal device determines a transmission power of the target uplink signal according to a transmission power of the reference uplink signal.

In an implementation mode, the terminal device determines the transmission power of the reference uplink signal as the transmission power of the target uplink signal.

In an implementation mode, the terminal device obtains the transmission power of the target uplink signal based on the transmission power of the reference uplink signal and an offset.

Optionally, the offset may be notified to the terminal device by the network device through an upper-layer signaling or a DCI signaling. For different target uplink signals, there may be different offsets (at this point, the reference uplink signals corresponding to different target uplink signals may be the same, of course, may also be different).

In act 230, the terminal device transmits the target uplink signal by using the determined transmission power.

Therefore, in an implementation of the present disclosure, a terminal device may determine a transmission power of a target uplink signal according to a transmission power of a reference uplink signal, such that by referring to a transmission power of an uplink signal, a transmission power of another uplink signal may be reasonably determined as required and a power control parameter of the other uplink signal may further be configured, thereby a communication performance may be improved.

Figure 3:
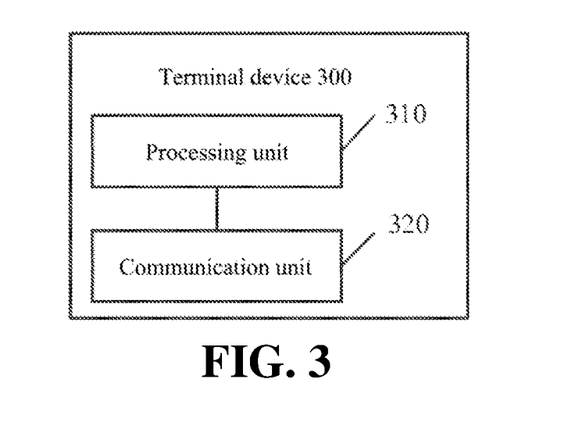
FIG. 3 is a schematic block diagram of a terminal device according to an implementation of the present disclosure.

FIG. 3 is a schematic block diagram of a terminal device 300 according to an implementation of the present disclosure. As shown in FIG. 3, the terminal device 300 includes a processing unit 310 and a communication unit 320.

The processing unit 310 is used for determining a reference uplink signal of a target uplink signal, and determining a transmission power of the target uplink signal according to a transmission power of the reference uplink signal.

The communication unit 320 is used for transmitting the target uplink signal by using the transmission power determined by the processing unit.

Optionally, the target uplink signal is a Physical Uplink Shared Channel (PUSCH), a Physical Uplink Control Channel (PUCCH), a Physical Random Access Channel (PRACH), a Phase Tracking Reference Signal (PTRS), or a Sounding Reference Signal (SRS).

Optionally, the reference uplink signal is a PUSCH, a PUCCH, a PRACH, a PTRS, or an SRS.

Optionally, the target uplink signal and the reference uplink signal are uplink signals of a same type.

Optionally, the target uplink signal is an SRS transmitted on a first SRS resource, and the reference uplink signal is an SRS transmitted on a second SRS resource associated with the first SRS resource.

Optionally, the first SRS resource and the second SRS resource belong to a same SRS resource group.

Optionally, the second SRS resource is an SRS resource configured by a network device for the first SRS resource in the SRS resource group; or, the second SRS resource is a preset SRS resource in the SRS resource group.

Optionally, the same SRS resource group is used for an uplink beam management.

Optionally, the second SRS resource is an SRS resource configured for the terminal device by the network device through an SRS Resource Indication (SRI) and associated with the first SRS resource.

Optionally, the target uplink signal is a PUSCH; the processing unit 310 is further used for determining the reference uplink signal based on Downlink Control Information (DCI) for scheduling the PUSCH.

Optionally, the target uplink signal is a PTRS, and the reference uplink signal is a PUSCH or a DMRS transmitted on a Demodulation Reference Signal (DMRS) port associated with the PTRS.

Optionally, the target uplink signal and the reference uplink signal satisfy a specific relationship on at least one of a frequency domain transmission resource, a time domain transmission resource, a transmission port and a transmission beam.

Optionally, the target uplink signal and the reference uplink signal are transmitted on a same carrier or adjacent carriers.

Optionally, the target uplink signal and the reference uplink signal are transmitted through a same port.

Optionally, the target uplink signal and the reference uplink signal are transmitted through a same beam.

Optionally, the target uplink signal is an SRS, and the reference uplink signal is a PUSCH or a PUCCH transmitted last time before transmitting the SRS.

Optionally, the target uplink signal is an uplink signal of a New Radio (NR) system, and the reference uplink signal is an uplink signal of a Long Term Evolution (LTE) system.

Optionally, the processing unit 310 is further used for determining the transmission power of the reference signal uplink signal as the transmission power of the target uplink signal.

Optionally, the processing unit 310 is further used for obtaining the transmission power of the target uplink signal based on the transmission power of the reference uplink signal and an offset.

It should be understood that the terminal device 300 may correspond to the terminal device in the method 200, and it may realize corresponding operations of the terminal device in the method 200, which will not be repeated here for sake of conciseness.

Figure 4:
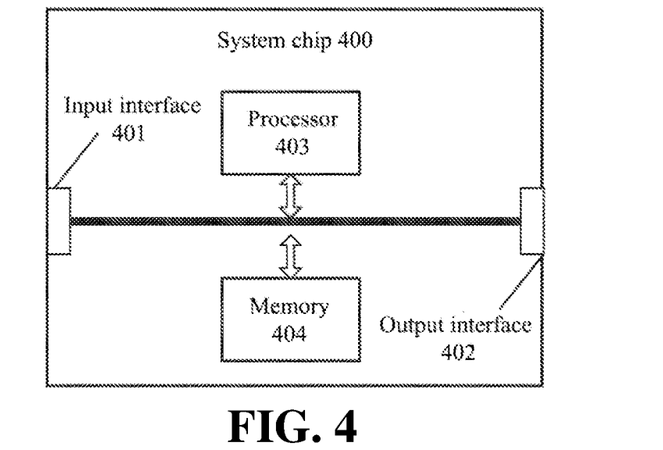
FIG. 4 is a schematic block diagram of a system chip according to an implementation of the present disclosure.

FIG. 4 is a schematic structural diagram of a system chip 400 according to an implementation of the present disclosure. The system chip 400 in FIG. 4 includes an input interface 401, an output interface 402, a processor 403 and a memory 404. The processor 403 and the memory 404 may be connected through internal communication connection lines. The processor 403 is used for executing codes in the memory 404.

Optionally, when the codes are executed, the processor 403 implements the method implemented by the terminal device in the method implementations. This will not be repeated here for sake of conciseness.

Figure 5:
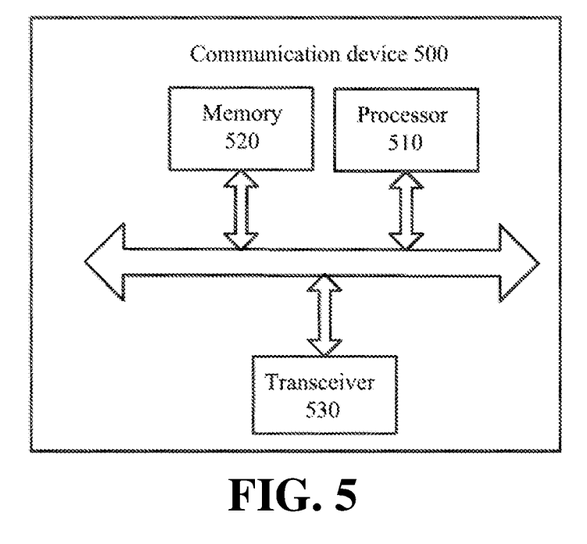
FIG. 5 is a schematic block diagram of a communication device according to an implementation of the present disclosure.

FIG. 5 is a schematic block diagram of a communication device 500 according to an implementation of the present disclosure. As shown in FIG. 5, the communication device 500 includes a processor 510 and a memory 520. The memory 520 may store program codes, and the processor 510 may execute the program codes stored in the memory 520.

Optionally, as shown in FIG. 5, the communication device 500 may include a transceiver 530, and the processor 510 may control the transceiver 530 to communicate with an external device.

Optionally, the processor 510 may call the program codes stored in the memory 520 to perform corresponding operations of the terminal device in the method implementations. This will not be repeated here for sake of conciseness.

It should be understood that the processor in an implementation of the present disclosure may be an integrated circuit chip with a capability for processing signals. In an implementation process, the actions of method implementations described above may be accomplished by integrated logic circuits of hardware in the processor or instructions in the form of software. The above processor may be a general purpose processor, a digital signal processor (DSP), an disclosure specific integrated circuit (ASIC), a field programmable gate array (FPGA), or other programmable logic device, discrete gate or transistor logic device, or discrete hardware component. Various methods, acts and logic block diagrams disclosed in implementations of the present disclosure may be accomplished or implemented. The general purpose processor may be a microprocessor or the processor may be any conventional processor or the like. The actions of the method disclosed in connection with the implementations of the present disclosure may be directly embodied by an execution of a hardware decoding processor, or by an execution of a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the actions of the method in combination with its hardware.

It should be understood that the memory in implementations of the present disclosure may be a volatile memory or non-volatile memory, or may include both volatile and non-volatile memory. The non-volatile memory may be a read-only memory (ROM), a programmable ROM (PROM), an erasable programmable ROM (EPROM), an electrically erasable programmable ROM (EEPROM), or a flash memory. The volatile memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described here are intended to include, but are not limited to, these and any other suitable types of memories.

Those of ordinary skill in the art will recognize that the exemplary units and algorithm acts described in connection with the implementations disclosed in the document may be implemented in electronic hardware, or a combination of computer software and electronic hardware. Whether these functions are implemented in hardware or software depends on a specific disclosure and design constraint of the technical solution. Skilled in the art may use different manners to realize the described functions for each particular disclosure, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described here again.

In several implementations provided by the present disclosure, it should be understood that the disclosed system, device and method may be implemented in other ways. For example, the apparatus implementations described above are only illustrative, for example, a division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementation.

In addition, various functional units in various implementations of the present disclosure may be integrated in one processing unit, or various units may be physically present separately, or two or more units may be integrated in one unit.

If the functions may be implemented in a form of a software functional unit and sold or used as a separate product, the software may be stored in a computer readable storage medium. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A method for wireless communication, comprising:
   determining, by a terminal device, a reference uplink signal of a target uplink signal;
   determining, by the terminal device, a transmission power of the target uplink signal according to a transmission power of the reference uplink signal; and
   transmitting, by the terminal device, the target uplink signal by using the determined transmission power,
   wherein the target uplink signal is a PTRS, the reference uplink signal is a PUSCH transmitted on a Demodulation Reference Signal (DMRS) port associated with the PTRS.

2. The method of claim 1, wherein the target uplink signal and the reference uplink signal satisfy a specific relationship on at least one of a frequency domain transmission resource, a time domain transmission resource, a transmission port and a transmission beam.

3. The method of claim 2, wherein the target uplink signal and the reference uplink signal are transmitted on a same carrier or adjacent carriers.

4. The method of claim 2, wherein the target uplink signal and the reference uplink signal are transmitted through a same beam.

5. The method of claim 1, wherein determining, by the terminal device, the transmission power of the target uplink signal according to the transmission power of the reference uplink signal, comprises:
   obtaining, by the terminal device, the transmission power of the target uplink signal based on the transmission power of the reference uplink signal and an offset.

6. The method of claim 5, wherein the offset is sent to the terminal device by a high layer signaling.

7. A terminal device, comprising a processor and a transmitter;
   wherein the processor is configured to determine a reference uplink signal of a target uplink signal, and determining a transmission power of the target uplink signal according to a transmission power of the reference uplink signal;
   wherein the transmitter is configured to transmit the target uplink signal by using the transmission power determined by the processor; and
   wherein the target uplink signal is a PTRS, the reference uplink signal is a PUSCH transmitted on a Demodulation Reference Signal (DMRS) port associated with the PTRS.

8. The terminal device of claim 7, wherein the target uplink signal and the reference uplink signal satisfy a specific relationship on at least one of a frequency domain transmission resource, a time domain transmission resource, a transmission port and a transmission beam.

9. The terminal device of claim 8, wherein the target uplink signal and the reference uplink signal are transmitted on a same carrier or adjacent carriers.

10. The terminal device of claim 8, wherein the target uplink signal and the reference uplink signal are transmitted through a same beam.

11. The terminal device of claim 7, wherein the processor is further configured to obtain the transmission power of the target uplink signal based on the transmission power of the reference uplink signal and an offset.

12. The terminal device of claim 11, wherein the offset is sent to the terminal device by a high layer signaling.

13. A network device, comprising a processor, a transmitter and a receiver;

wherein the receiver is configured to receive a target uplink signal with a transmission power from a terminal device, wherein the transmission power of the target uplink signal is determined by the terminal device according to a transmission power of a reference uplink signal;

wherein the processor is configured to process the target uplink signal; and wherein the target uplink signal is a PTRS, the reference uplink signal is a PUSCH transmitted on a Demodulation Reference Signal (DMRS) port associated with the PTRS.

14. The network device of claim 13, wherein the transmission power of the target uplink signal is based on the transmission power of the reference uplink signal and an offset.

15. The network device of claim 14, wherein the offset is sent to the terminal device through the transmitter by a high layer signaling.

* * * * *